United States Patent
Scoville

(10) Patent No.: US 7,622,965 B2
(45) Date of Patent: Nov. 24, 2009

(54) DUAL-EDGE SHAPING LATCH/SYNCHRONIZER FOR RE-ALIGNING EDGES

(75) Inventor: Christopher W. Scoville, Burlington, VT (US)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 11/275,835

(22) Filed: Jan. 31, 2006

(65) Prior Publication Data

US 2006/0087357 A1 Apr. 27, 2006
US 2007/0176662 A1 Aug. 2, 2007

(51) Int. Cl.
*H03L 7/00* (2006.01)
*H03K 21/00* (2006.01)

(52) U.S. Cl. ........... 327/144; 327/145; 327/115; 327/117; 377/47

(58) Field of Classification Search ............ None
See application file for complete search history.

(56) References Cited

U.S. PATENT DOCUMENTS

| | | | | |
|---|---|---|---|---|
| 3,812,384 A * | 5/1974 | Skorup | ................ | 365/154 |
| 3,902,125 A * | 8/1975 | Oliva, Jr. | ................ | 377/108 |
| 4,769,558 A * | 9/1988 | Bach | ................ | 327/297 |
| 4,973,860 A * | 11/1990 | Ludwig | ................ | 327/145 |
| 5,087,829 A * | 2/1992 | Ishibashi et al. | ................ | 327/152 |
| 5,365,119 A * | 11/1994 | Kivari | ................ | 327/115 |
| 5,410,263 A * | 4/1995 | Waizman | ................ | 327/141 |
| 5,467,038 A * | 11/1995 | Motley et al. | ................ | 327/185 |
| 5,557,225 A * | 9/1996 | Denham et al. | ................ | 327/199 |
| 6,060,922 A * | 5/2000 | Chow et al. | ................ | 327/175 |
| 6,339,441 B2 * | 1/2002 | Suzuki | ................ | 347/133 |
| 6,404,839 B1 * | 6/2002 | Fong et al. | ................ | 377/47 |
| 6,563,356 B2 * | 5/2003 | Fulkerson | ................ | 327/203 |
| 6,696,870 B2 * | 2/2004 | Dellow | ................ | 327/115 |
| 6,998,885 B2 * | 2/2006 | Kim | ................ | 327/144 |
| 2002/0171459 A1* | 11/2002 | Dellow | ................ | 327/115 |
| 2005/0134348 A1* | 6/2005 | Florescu | ................ | 327/218 |

* cited by examiner

*Primary Examiner*—Tuan Lam
(74) *Attorney, Agent, or Firm*—Michael LeStrange; Greenblum & Bernstein PLC

(57) ABSTRACT

Integrated circuit and process for aligning a first signal with a second signal. The integrated circuit includes a single latch, a switch control circuit coupled to an input of the single latch to align an edge of the first signal with an edge of the second signal, and a second switch control circuit coupled to the output of the single latch to produce a 50% duty cycle output.

27 Claims, 17 Drawing Sheets

Table 1: Switch control ($0 < t_D < \frac{1}{2} t_{cycle}$)

| | | | | SW | |
|---|---|---|---|---|---|
| | P0 | CLKDIV | CLK | $N_{fet}$ | $P_{fet}$ |
| EVEN | 0 | 0 | 0 | 0 | 1 |
| EVEN | 0 | 0 | 1 | 1 | 0 |
| EVEN | 0 | 1 | 0 | 0 | 1 |
| EVEN | 0 | 1 | 1 | 1 | 0 |
| ODD | 1 | 0 | 0 | 1 | 0 |
| ODD | 1 | 0 | 1 | 0 | 1 |
| ODD | 1 | 1 | 0 | 0 | 1 |
| ODD | 1 | 1 | 1 | 1 | 0 |

Figure 9

|      | P0 | CLKDIV | CLK | SW $N_{fet}$ | $P_{fet}$ |
|------|----|--------|-----|------|------|
| EVEN | 0  | 0      | 0   | 1    | 0    |
| EVEN | 0  | 0      | 1   | 0    | 1    |
| EVEN | 0  | 1      | 0   | 1    | 0    |
| EVEN | 0  | 1      | 1   | 0    | 1    |
| ODD  | 1  | 0      | 0   | 0    | 1    |
| ODD  | 1  | 0      | 1   | 1    | 0    |
| ODD  | 1  | 1      | 0   | 1    | 0    |
| ODD  | 1  | 1      | 1   | 0    | 1    |

Figure 13

| | CLK3 | CLK1 | $N_{fet}$ | SW $P_{fet}$ |
|---|---|---|---|---|
| $t_D < \tfrac{1}{2}\, t_{cycle}$ | 0 | 0 | 0 | 1 |
| | 0 | 1 | 1 | 0 |
| | 1 | 0 | 1 | 0 |
| | 1 | 1 | 0 | 1 |

Figure 16

|  | CLK3 | CLK1 | $N_{fet}$ | SW $P_{fet}$ |
|---|---|---|---|---|
| $\frac{1}{2} < t_D < 1\, t_{cycle}$ | 0 | 0 | 1 | 0 |
|  | 0 | 1 | 0 | 1 |
|  | 1 | 0 | 0 | 1 |
|  | 1 | 1 | 1 | 0 |

Figure 18

NFET

CLKDIV-CLK

|  | 0 0 | 0 1 | 1 1 | 1 0 |
|---|---|---|---|---|
| P0 1 | 1 | 0 | 1 | 0 |
| 0 | 0 | 1 | 1 | 0 |

PFET

CLKDIV-CLK

|  | 0 0 | 0 1 | 1 1 | 1 0 |
|---|---|---|---|---|
| P0 1 | 0 | 1 | 0 | 1 |
| 0 | 1 | 0 | 0 | 1 |

Figure 20

DUAL-EDGE SHAPING LATCH/SYNCHRONIZER FOR RE-ALIGNING EDGES

FIELD OF THE INVENTION

The instant invention relates to a process and device to re-align/synchronize edges of two periodic signals, in which one is either an integer multiple of the other or of the same frequency.

BACKGROUND DESCRIPTION

A desired feature in some phase locked loops (PLL) is aligning a clocked output and a divided down (in frequency) version of the clock, e.g., to align two clocks which are integer multiples of each other. In the known art, simple dual latch designs have been utilized, however, these designs do not preserve the 50% duty ratio for odd divide ratios. Moreover, alignment of the clock signals has been difficult due to delay through the clock dividers as the result of temperature, voltage operating range, and processing.

As shown in FIG. 1, a clock signal (Clock A) can be applied to a divider 11, e.g., a 2-8 divider, to produce an output Clock B. Thus, Clock B is derived from a divided down earlier version of Clock A. However, as discussed above, delay through divider 11 can vary, e.g., due to temperature, voltage, processing. A graphical representation of this delay is shown in FIG. 2, in which the rising edge of the output from the divider CLOCK B is delayed from the rising edge of the input to the divider CLOCK A. Further, the delay in the divider may be different depending upon the divide ratio. By way of example, for even divide ratios, the delay may be, e.g., 97 picoseconds, while for odd divide ratios, the delay may be, e.g., 94 picoseconds. As a result, up to a 400 picosecond delay may be achieved over all divide ratios. Moreover, with arrangement shown in FIG. 2, CLOCK B for odd divide ratios does not have a 50% duty cycle.

SUMMARY OF THE INVENTION

The present invention is directed to an integrated circuit capable of aligning a first signal with a second signal. The integrated circuit includes a single latch and a switch control circuit coupled to an input of the single latch to align an edge of the first signal with an edge of the second signal with a 50% duty cycle output.

In accordance with a feature of the invention, the second signal is a divided ratio of the first signal. Further, the first and second signals can have a same frequency.

Further, the invention is directed to a process for aligning a first signal with a second signal. The process includes applying the second signal to an input of a single switch shaping latch and aligning an edge of the second signal with an edge of the first signal. An output of the single switch shaping latch has a 50% duty cycle output.

The instant invention is directed to a clock signal synchronization device that includes a shaping latch composed of a single switch.

According to a feature of the invention, the device can further include a divider, arranged to output a divided ratio of a clock signal, coupled to the shaping latch. The shaping latch aligns the edges of the clock signal with edges of the divided ratio of the clock signal. Further, the divider can be an adjustable divider. The divided ratio of the clock signal may be an even divided ratio or the divided ratio of the clock signal may be an odd divided ratio.

In accordance with another feature of the invention, the switch can be a CMOS switch. Further, the divider may create a delay in the divided ratio of the clock signal with respect to the clock signal of between 0 and ½ a clock cycle. In this situation, the clock signal can be inverted before being input to the divider. Moreover, the divider may create a delay in the divided ratio of the clock signal with respect to the clock signal of between ½ a clock cycle and a full clock cycle. In this situation, the clock signal can be input directly into the divider.

According to still another feature of the present invention, the shaping latch can align the edges of the two clock signals having a same frequency. The shaping latch may create a delay between a reference clock signal and a clock signal to be aligned.

The shaping latch can align the edges of the two clock signals having a different frequency. Moreover, the different frequencies can be multiples of each other.

The present invention is directed to a process for synchronizing a first clock signal with a second clock signal, in which edges of the second clock signal are not aligned with edges of the first clock signal. The process includes aligning the edges of the second clock signal with the edges of the first clock signal through a shaping latch composed of a single switch.

According to a feature of the invention, the process can further include dividing the first clock signal in a divider to form the second clock signal. In this regard, the second clock signal can be an even divided ratio of the first clock signal, or the second clock signal can be an odd divided ratio of the first clock signal.

In accordance with another feature of the invention, the second clock signal may have a different frequency than the first clock signal. Further, the second clock signal can be a multiple of the first clock signal.

According to still yet another feature of the present invention, the first and second clock signals may have a same frequency. Further, the shaping latch can create a delay between a first clock signal and the second clock signal. The process can also include delaying the first clock signal.

BRIEF DESCRIPTION OF THE DRAWINGS

FIG. 9 schematically illustrates a truth table for operating the CMOS switch depicted in FIG. 6;

FIG. 13 schematically illustrates a truth table for operating the CMOS switch in the circuit depicted in FIG. 12;

FIG. 16 schematically illustrates a truth table for operating the CMOS switch under a first restriction;

FIG. 18 schematically illustrates a truth table for operating the CMOS switch under a second restriction and uses LATCH shown in FIG. 5;

FIG. 20 schematically illustrates a 3 variable Karnaugh map; and

DETAILED DESCRIPTION OF EMBODIMENTS OF THE INVENTION

The present invention is directed to a process and device for aligning/synchronizing clock signals that are either integer multiples of each other or of a same frequency without the above-noted drawbacks of the known art. In particular, the instant invention utilizes both periodic signals to control the alternating latching edges during even and odd divide ratios, preserves a 50% duty cycle for even and odd divide ratios (assuming lower frequency signal has a 50% duty cycle), re-aligns/synchronizes edges, and eliminates need to further divide down clock using edge triggered divider to achieve a 50% duty cycle. Moreover, the instant invention realigns/synchronizes clock edges, such that static phase error, i.e., the difference between the input and output clock, is reduced in PLL's. While there is no theoretical maximum frequency for the clock signals, voltage level and current technology provide practical limits.

According to the invention, a shaping latch, operational in a functional and bypass mode, is utilized to line up/synchronize edges of clock signals.

Figure 3:
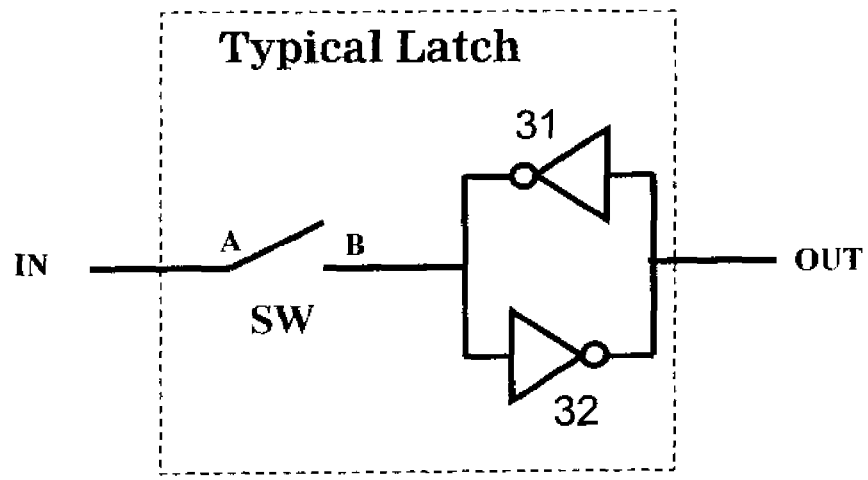
FIG. 3 schematically illustrates a shaping latch in accordance with the instant invention.
Figure 4:
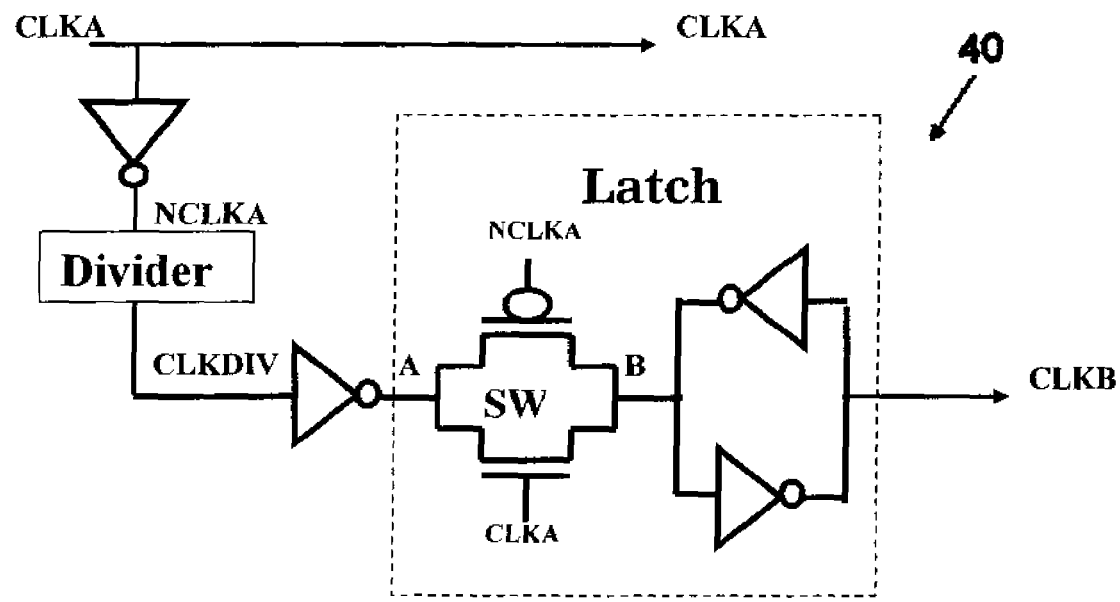
FIG. 4 schematically illustrates an example application of the shaping latch of the instant invention.

Known techniques utilize a shaping latch, which is schematically illustrated in FIG. 3. In this schematic illustration, shaping latch 30 is composed of a switch SW has an input A and an output B and a pair of oppositely arranged inverters 31 and 32 coupled to output B. A switching latch input IN is coupled to input A of switch SW and a switching latch output OUT is coupled to an end of inverters 31 and 32 opposite output B. However, this arrangement cannot provide the 50% duty cycle for odd divide ratios. Accordingly, as shown in FIG. 4, the conventional method utilizes a CMOS switch 40 having a switch input IN and a switch output OUT which is controlled by the undivided down clock and its inverse (CLKA and NCLKA).

Figure 5:
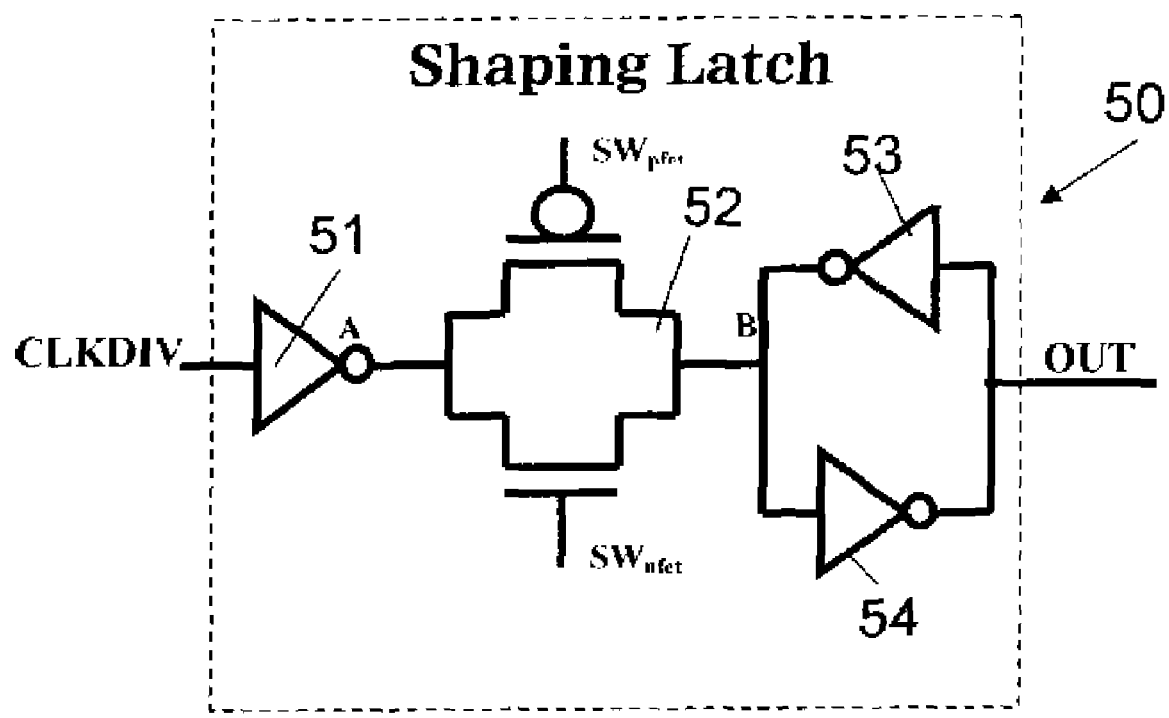
FIG. 5 schematically illustrates a shaping latch in accordance with the present invention.

Thus, the dual-edge shaping latch/synchronizer of the present invention utilizes a shaping latch 50 as illustrated in FIG. 5. In particular, shaping latch 50 is composed of inverter 51 to receive and invert a divided clock signal CLKDIV (discussed below), CMOS switch 52 having an input A and output B, and a pair of oppositely arranged inverters 53 and 54 coupled to output B. Switches $SW_{pfet}$ and $SW_{nfet}$ controlling the operation of CMOS switch 52 are defined, when delay $t_d$ is between 0 and ½ $t_{cycle}$, in the table shown in FIG. 11. In contrast to the arrangement illustrated in FIG. 3, shaping latch 50 will provide a 50% duty cycle for both even divide ratios and odd divide ratios.

Figure 6:
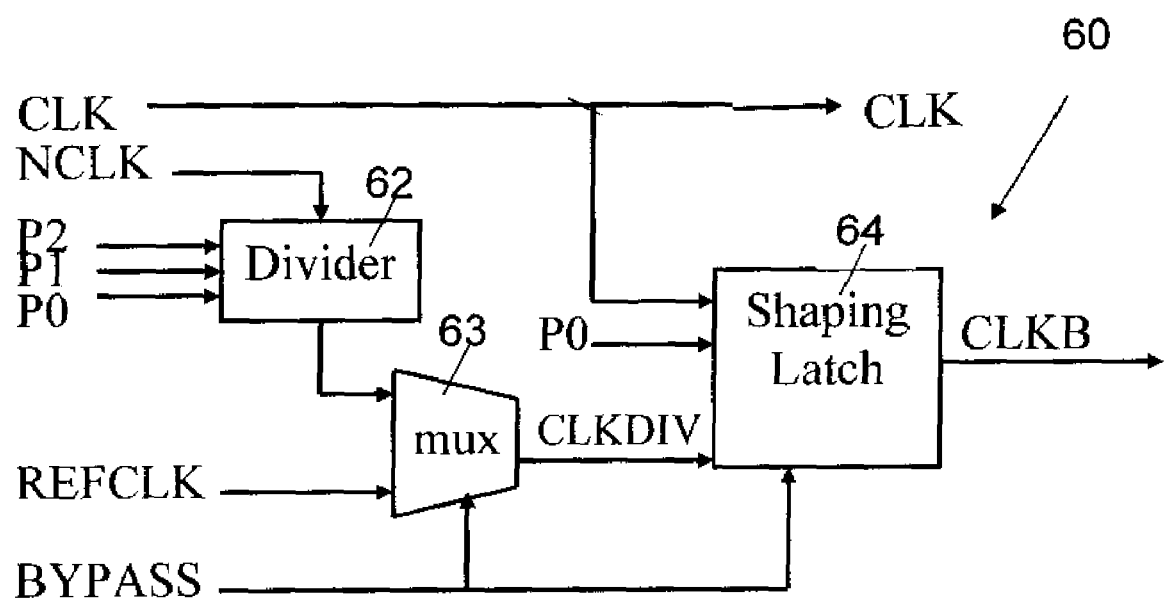
FIG. 6 schematically illustrates an example application of the circuit depicted in FIG. 5.

A more detailed example of a dual edge shaping latch/synchronizer of the invention is shown in the block diagram of FIG. 6, which shows a device 60 for realigning edges of clock signals that are multiples of each other. In this diagram, clock signal CLK represents the undivided down clock. Clock signal CLK is inverted as inverted clock signal NCLK and applied to a divider 62, which can be an adjustable three bit divider having inputs P0, P1, and P2 in order to provide a divisor from between 2-8. The output of divider 62, i.e., the divided clock signal, is supplied to an input of multiplexer 63. Another input to multiplexer 63 is coupled to a reference clock signal REFCLK, which has a frequency different from CLK, so that multiplexer 63 inputs the divided clock signal CKLDIV to shaping latch 64, which corresponds to the shaping latch 50 shown in FIG. 5. Shaping latch 64 also receives clock signal CLK and is coupled to bit P0, which indicates whether the division is even or odd, in order to output clock signal CLKB. Moreover, shaping latch 64 includes control algorithms for even and odd dividing, and the control algorithms can be presented as truth tables, discussed below.

Figure 7:
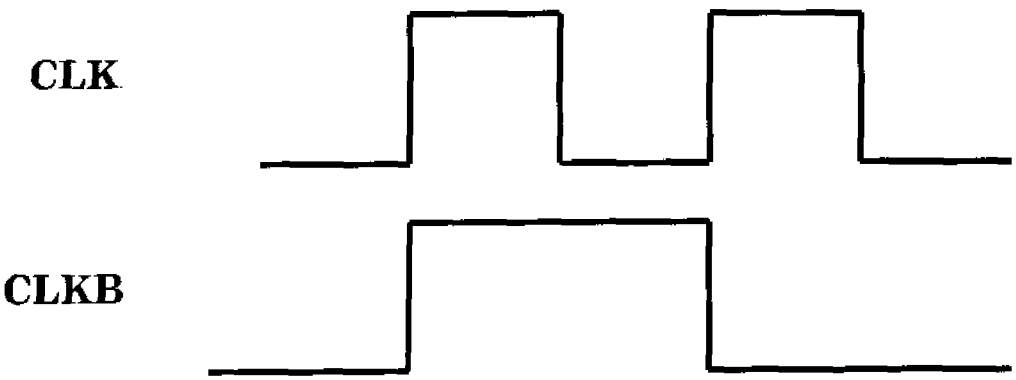
FIG. 7 schematically illustrates aligned edges of a clock signal and an even divide ratio of the clock signal.
Figure 8:
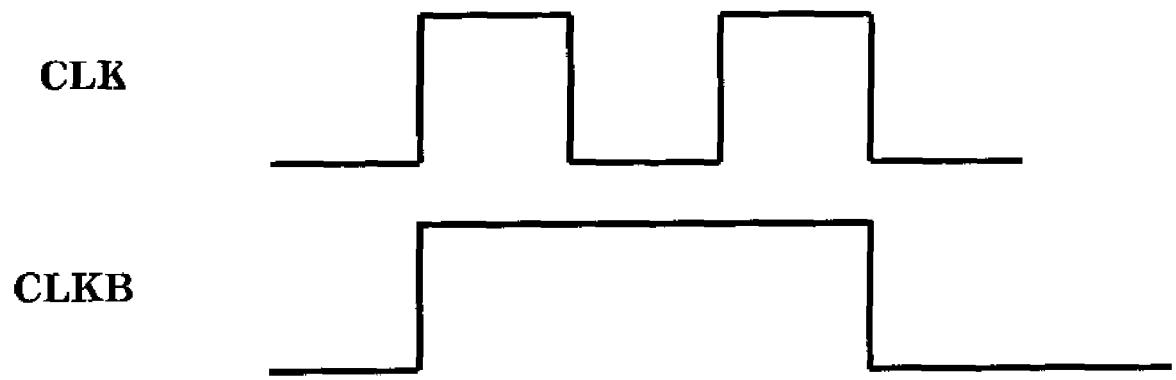
FIG. 8 schematically illustrates aligned edges of a clock signal and an odd divide ratio of the clock signal.

In accordance with the present invention, device 60 is operable to align or synchronize clock signals, e.g., CLK and CLKB. FIG. 7 shows clock signal CLK aligned with clock signal CLKB, which is an even divided ratio (e.g., ÷2) of CLK. As shown, during even divide ratios, a latch must be provided to latch on either a rising edge or falling edge of CLK (but not both). In contrast, FIG. 8 shows clock signal CLK aligned with clock signal CLKB, which is an odd divided ratio (e.g., ÷3) of CLK. In this example, during odd divide ratios, the latch must latch on both a rising edge and a falling edge of CLK in order to maintain a 50% duty cycle on CLKB.

Figure 1:
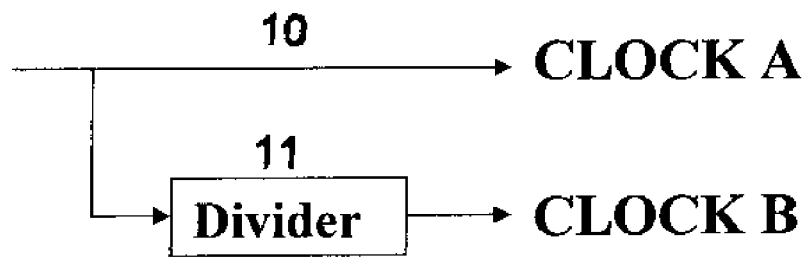
FIG. 1 schematically illustrates a clock signal and a divided ratio of the clock signal.
Figure 2:
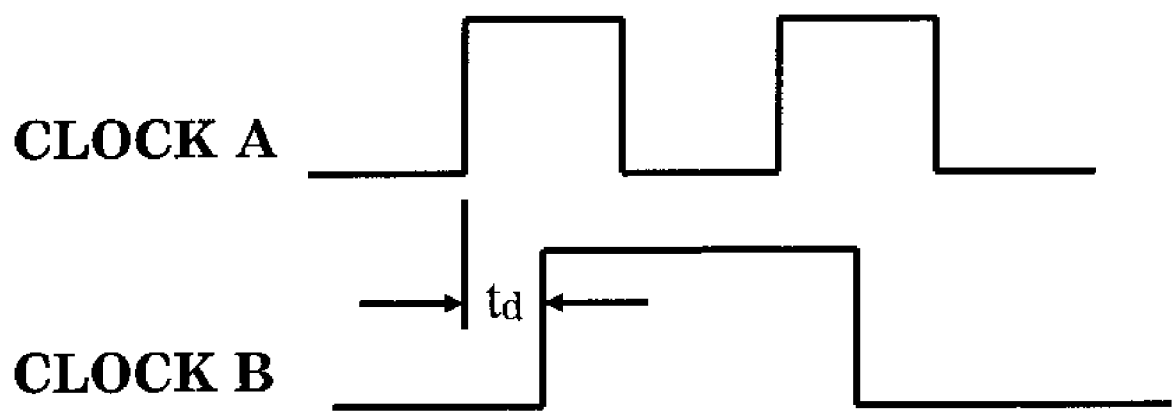
FIG. 2 schematically illustrates the delay in the divided clock signal.

As discussed above, known dividers produce a delay td that offsets a clock signal into a divider from the divided down clock signal out of the divider, as shown in FIG. 2. However, the amount of delay $t_d$ for a given divider is generally known. Moreover, this knowledge is utilized in accordance with the instant invention to define one of two restrictions for the delay associated with the divider, i.e., $0 < t_d < ½$ cycle; or ½ cycle $< t_d < t_{cycle}$, the time for one clock cycle.

Figure 12:
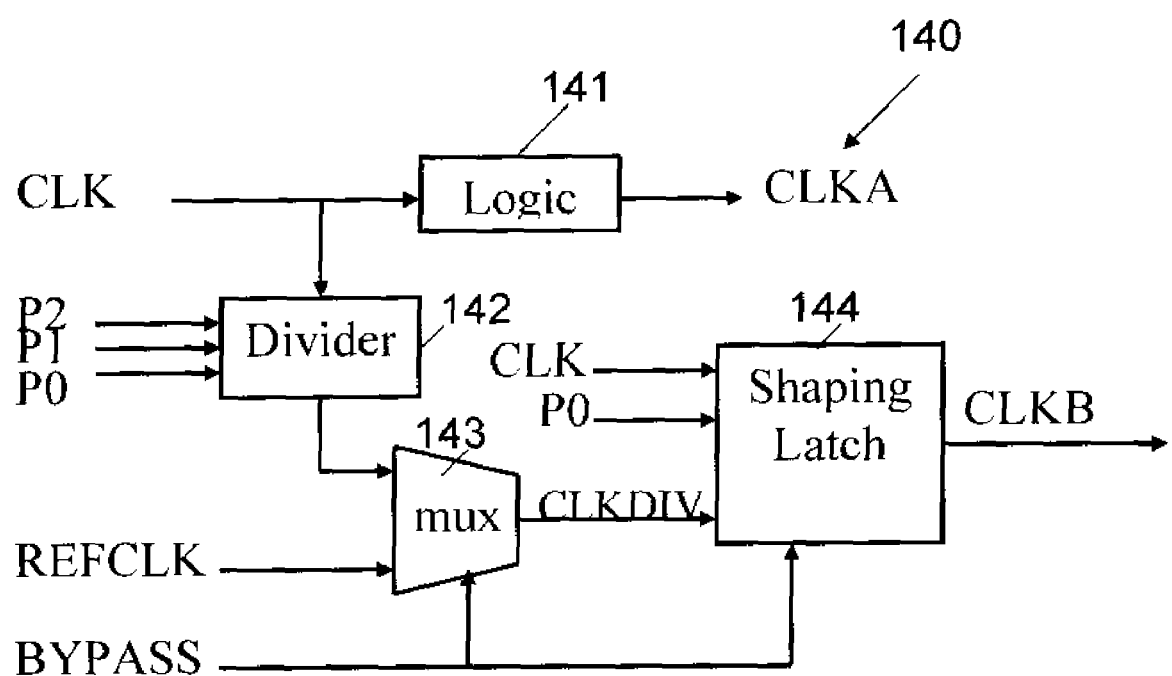
FIG. 12 schematically illustrates a detailed example of the circuit depicted in FIG. 5 for aligning a rising edge to a falling edge.

In addition to the restriction based upon divider delay, synchronization/edge alignment of the clock signals can be achieved in one of four manners, i.e., rising-rising; rising-falling; falling-rising; and falling-falling. In the rising-rising alignment, the rising edge of the divided down clock (CLKDIV) always coincides with rising edge of higher frequency clock (CLK), whereas in the rising-falling, the rising edge of divided down clock (CLKDIV) always coincides with the falling edge of the higher frequency clock (CLK), or equivalently, aligns the rising edge of divided down clock (CLKDIV) with the rising edge of the inverse of the higher frequency clock (CLKN) (assumes 50% duty cycle on each clock). Thus, this can be achieved by inverting the input to the divider, so that CLK is divided as shown in FIG. 12, and invert all the control bits of the truth table (discussed below) as shown in FIG. 13. In the falling-rising alignment, a falling edge of divided down clock (CLKDIV) always coincides with rising edge of higher frequency clock (CLK). For this alignment, the output (OUT) is an inverted version of the rising-rising alignment case, and, therefore, is a function of the same truth table (see FIG. 9), in which the OUT signal should be inverted in order to obtain falling-rising aligned signals. In the falling-falling alignment, the falling edge of divided down clock (CLKDIV) always coincides with falling edge of higher frequency clock (CLK). For this alignment, the output (OUT) is an inverted version of the rising-falling alignment case, and, therefore, is a function of the same truth table (see FIG. 13), in which the OUT signal is inverted to obtain falling-falling aligned signals.

Restriction 1 ($0 < t_d < \frac{1}{2} t_{cycle}$), i.e., the delay through the divider is <½ clock cycle of CLKA and delay through inverters and switching latch is neglected, can be discussed with reference to the device depicted in FIG. 6 and to the timing diagram shown in FIG. 10.

When shaping latch 64 is formed by shaping latch 50 of FIG. 5, the pair of switches $P_{fet}$ and $N_{fet}$ control CMOS switch 52 according to the table shown in FIG. 9. In the table, logic "1" refers to the switch being closed (shorted) for the $N_{fet}$ column and open for the $P_{fet}$ column. Moreover, when $P_{fet}$ is high and $N_{fet}$ is low, CMOS switch 52 is open, and when $P_{fet}$ is low and $N_{fet}$ is high, CMOS switch 52 is closed.

Figure 10:
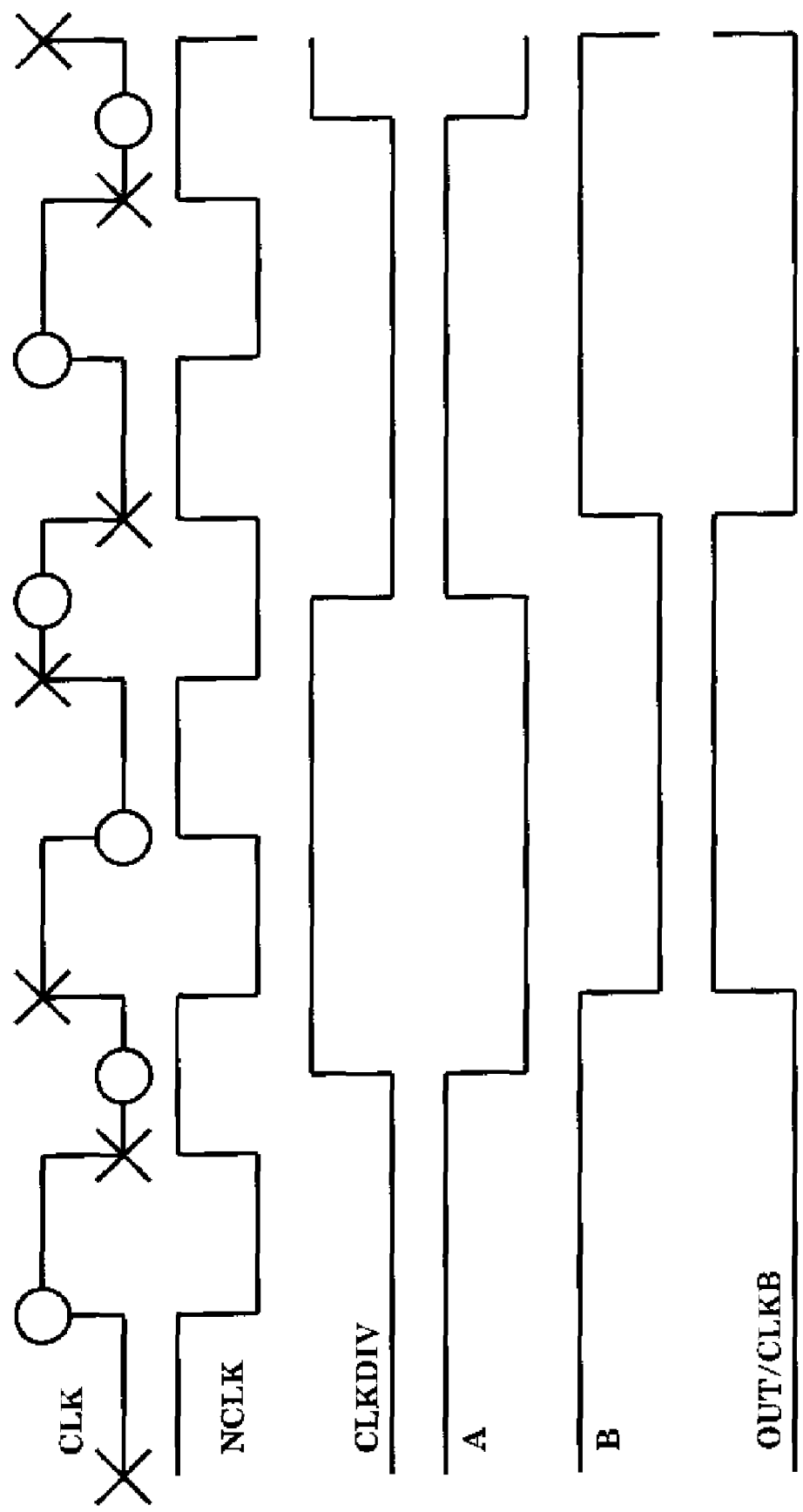
FIG. 10 schematically illustrates a timing diagram for the alignment depicted in FIG. 8 under a first restriction.

The timing diagrams shown in FIG. 10 depict an odd divide ratio (i.e., P0=1). As shown in FIG. 10, the opening/closing of CMOS switch 52 is superimposed on clock signal CLK, which is applied to shaping latch 64. The operation/control of CMOS switch 52 corresponds to the truth table depicted in FIG. 9. The inverse clock signal NCLK is supplied to divider 62, and divided clock signal CLKDIV is output from (and delayed by) divider 62 and input to shaping latch 64. Signal A, which is the inverse of CLKDIV, is the signal at the input to CMOS switch 52, and signal B is the signal at the output of CMOS switch 52. Shaping latch 64 inverts signal B to form output clock signal CLKB, which is rising edge aligned with CLK with 50% duty cycle.

Figure 11:
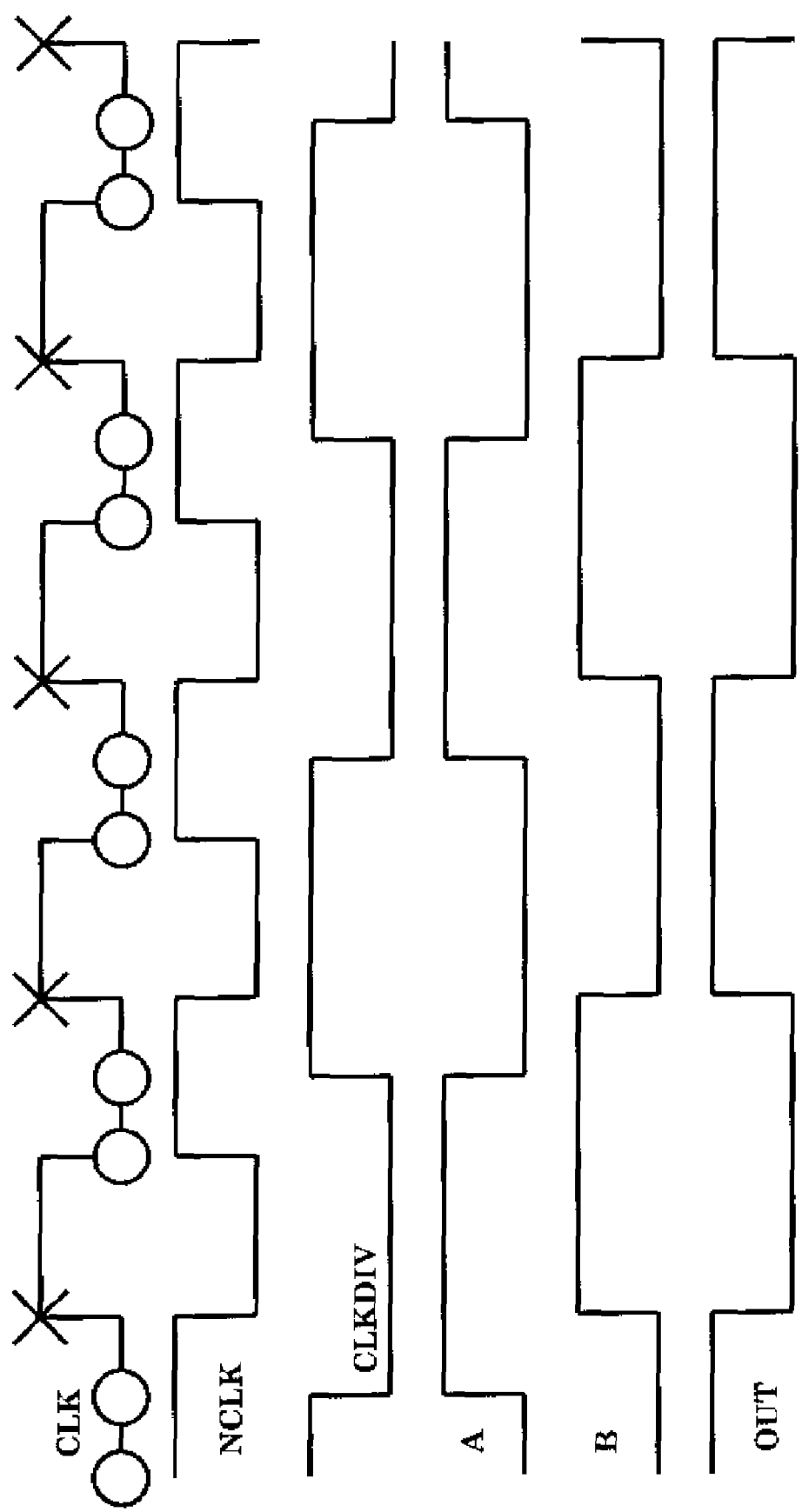
FIG. 11 schematically illustrates a timing diagram for the alignment depicted in FIG. 7 under a first restriction.

The timing diagrams shown in FIG. 11 depict an even divide ratio (i.e., P0=0). As shown in FIG. 11, the opening/closing of CMOS switch 40 is superimposed on clock signal CLK, which is applied to shaping latch 64. The operation/control of CMOS switch 52 corresponds to the truth table depicted in FIG. 9. The inverse clock signal NCLK is supplied to divider 62, and divided clock signal CLKDIV is output from (and delayed by) divider 62 and input to shaping latch 64. Signal A, which is the inverse of CLKDIV, is the signal at the input to CMOS switch 52, and signal B is the signal at the output of CMOS switch 40. Shaping latch 64 inverts signal B to form output clock signal CLKB, which is rising edge aligned with CLK with a 50% duty cycle.

To align rising edge (of lower freq clock/CLKDIV) to falling edge (of higher freq clock/CLK), invert CLKDIV (shift 180°) relative to CLK/NCLK and flip all of the control bits. It is noted that dividing down CLK is equivalent to inverting CLKDIV. In this regard, the device can be oriented in the manner illustrated in FIG. 12. FIG. 12 shows a device 140 for realigning edges of clock signals that are multiples of each other. In this diagram, clock signal CLK is applied to logic 141, which can be some type of delay that produces clock output signal CLKA. Clock signal CLK is applied to a divider 142, which can be an adjustable three bit divider having inputs P0, P1, and P2 in order to provide a divisor from between 2-8. The output of divider 142, i.e., the divided clock signal, is supplied to an input of multiplexer 143. Another input to multiplexer 143 is coupled to a reference clock signal REFCLK, which has a frequency different from CLK, so that multiplexer 143 inputs the divided clock signal CKLDIV to shaping latch 144, which corresponds to the shaping latch shown in FIG. 5. Shaping latch 144 also receives clock signal CLK and is coupled to bit P0, which indicates whether the division is even or odd, in order to output clock signal CLKB. Moreover, shaping latch 144 includes control algorithms for even and odd dividing for the rising-falling alignment, and the control algorithms can be presented as truth tables, see FIG. 13.

Further, it is noted that falling-rising edge alignment can be achieved by inverting OUT in the truth table shown in FIG. 9, and the falling-falling edge alignment can be achieved by inverting OUT in the truth table shown in FIG. 13.

In restriction 2, i.e., $\frac{1}{2} t_{cycle} < t_d < t_{cycle}$, the delay through the divider is known to be between $\frac{1}{2} t_{cycle}$ and $t_{cycle}$, which is logically equivalent to inverting CLKDIV (i.e., divided down CLK) from the previous restriction of $0 < t_d < \frac{1}{2} t_{cycle}$ for the rising-rising case. Thus, the device 140 depicted in FIG. 12 can be utilized in this restriction, but the truth table shown in FIG. 9 is used for operating/controlling CMOS switch 52. Further, other edge alignment scenarios (rising-falling, falling-rising and falling-falling) achieved similarly as described above.

Figure 14:
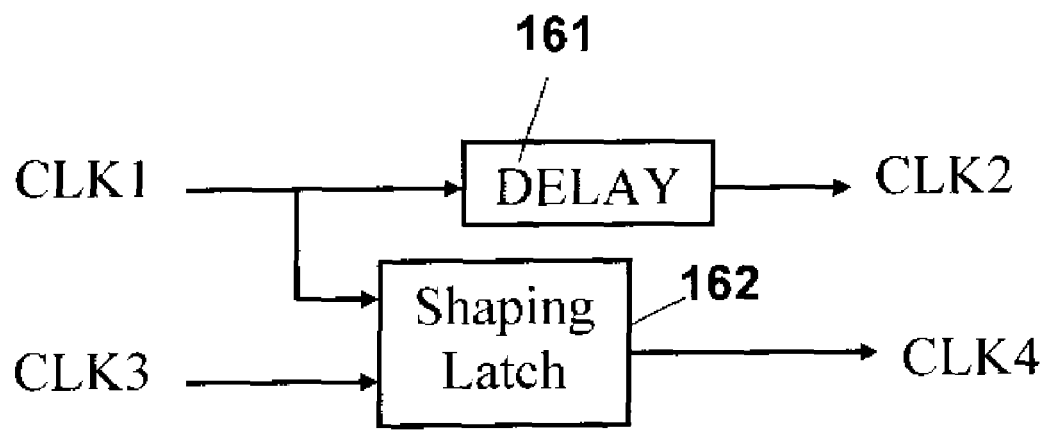
FIG. 14 schematically illustrates a circuit having two input clock signals of a same frequency.

The present invention also finds utility in aligning clocks of a same frequency. For this embodiment, the shaping-latch configuration still utilizes a single switch/latch, and the latch has no inverter. FIG. 14 illustrates a basic example of the edge aligning/synchronizing circuit, in which clock signals CLK1 and CLK3 are to be aligned. From this basic configuration it is noted that shaping latch 162, which can correspond to shaping latch 50 discussed above (except inverter 51 is replaced with a short), has a built-in delay that is just large enough to insure the control signal (CLK1) arrives at the switch before the signal being acted upon (CLK3) at the switch input. To compensate for the shaping latch delay, delay 161 is provided in the CLK1-CLK2 path.

Figure 15:
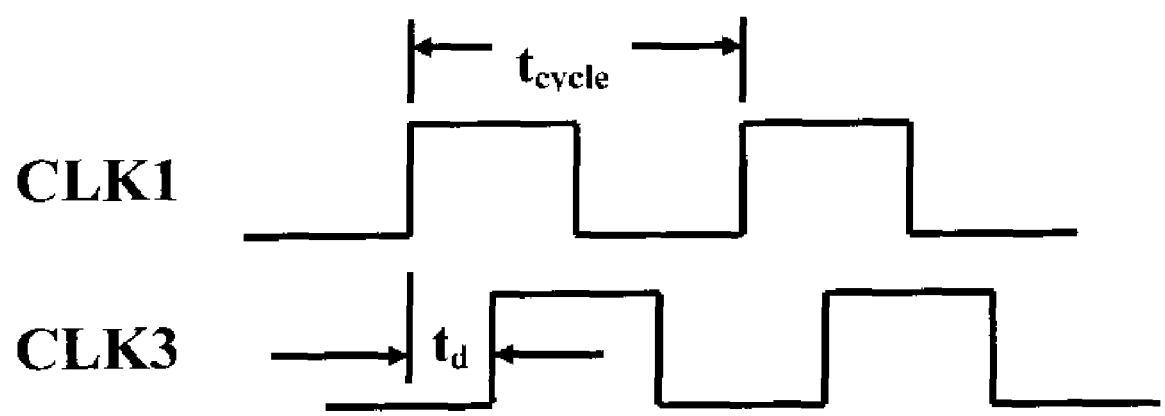
FIG. 15 schematically illustrates a timing diagram showing the delay in the second clock signal.
Figure 17:
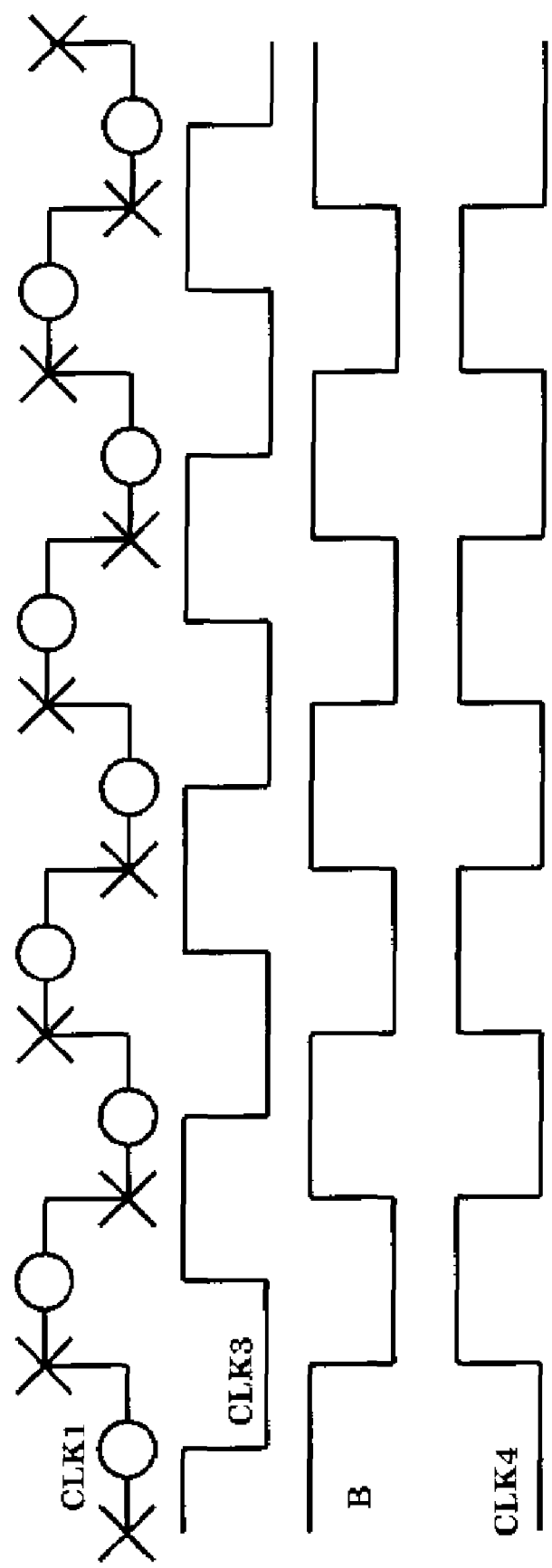
FIG. 17 schematically illustrates a timing diagram for aligning the edges under a first restriction.

Even when the clock frequencies are the same, the above-noted restrictions based upon delay are considered. However, in this situation, it is the inherent delay in the shaping latch that is considered for the restriction. In restriction 1 ($0 < t_d < \frac{1}{2} t_{cycle}$), i.e., the delay in CLK3 through the shaping latch is <½ clock cycle of CLK1, see FIG. 15. FIG. 16 illustrates the truth table for operating the CMOS switch 52 of shaping latch 162 (i.e., shaping latch 50), in which logic 1 refers to the switch being closed, i.e., nodes A and B shorted together for the $N_{fet}$ column and open for the $P_{fet}$ column. FIG. 17 shows a timing diagram for the alignment and synchronization of the edges of clock signals CLK1 and CLK3 having a same frequency, where "X" is switch closed (shorted/sample mode), and "O" is switch open (latched). As shown, the switch closes on the rising and falling of reference clock signal CLK1, and opens on the rising and falling of clock signal CLK3. As a result, signal B out of CMOS switch 52 is inverted but aligned and synchronized with CLK1, such that inverting signal B results in clock signal CLK4 that is rising edge aligned and synchronized with delayed reference signal CLK1, i.e., clock signal CLK2. For a falling-rising edge alignment, one need only invert CLK4.

Figure 19:
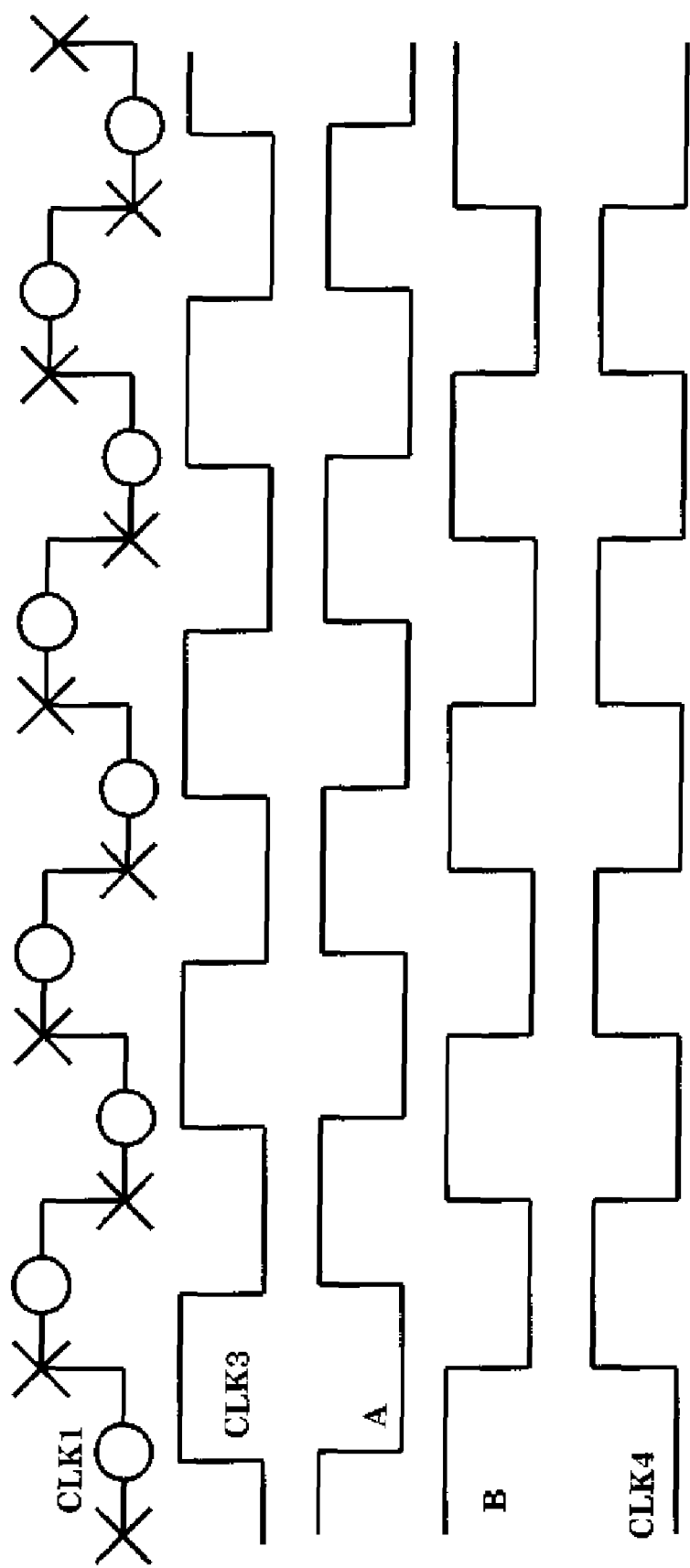
FIG. 19 schematically illustrates a timing diagram for aligning the edges under a second restriction.

In restriction 2, in which the delay is known to be-between $\frac{1}{2} t_{cycle}$ and $t_{cycle}$, operation is logically equivalent to an inverted CLK1 in case 1 ($0 < t_d < t_{cycle}$). Thus, either CLK1 or CLK3 can be inverted, and the truth table for operation of CMOS switch 52 is as shown in FIG. 18. The timing diagram for the alignment and synchronization of edges of same frequency clock signals for restriction 2 is shown in FIG. 19. As shown, the switch closes on the rising and falling of reference clock signal CLK1, and opens on the rising and falling of clock signal CLK3. As noted above, CLK3 can be inverted in restriction 2, such that signal A into CMOS switch 52 is an inverted CLK3 signal. As a result, signal B out of CMOS switch 52 is inverted but aligned and synchronized with CLK1, such that inverting signal B results in clock signal CLK4 that is rising edge aligned and synchronized with delayed reference signal CLK1, i.e., clock signal CLK2. For a falling-rising edge alignment, one need only invert CLK4.

The circuit for the instant invention can be provided by developing a 3 variable Karnaugh map from truth table 1 (see FIG. 9). An example of such a map is shown in FIG. 20, and solving yields the following Boolean expressions:

$$SW_{nfet}=(NCLK \cdot NCLKDIV \cdot P0)+((CLK \cdot NP0)+ ((CLK \cdot CLKDIV)$$

$$(SW_{pfet}=((CLK \cdot NCLKDIV \cdot P0)+((NCLK \cdot NP0)+ ((NCLK \cdot CLKDIV)$$

Converting NAND-SOP form to NOR-POS form for the Pfets allows both switches to be closed and allow REFCLK to pass through the latch during bypass mode.

$SW_{pfet}$=(CLK+CLKDIV+NP0)·(NCLK+P0)·(NCLK+NCLKDIV), where a Signal beginning in "N" is the logical inverse of the signal without the "N" at the beginning, i.e., NCLK is the inverse of CLK.

Figure 21:
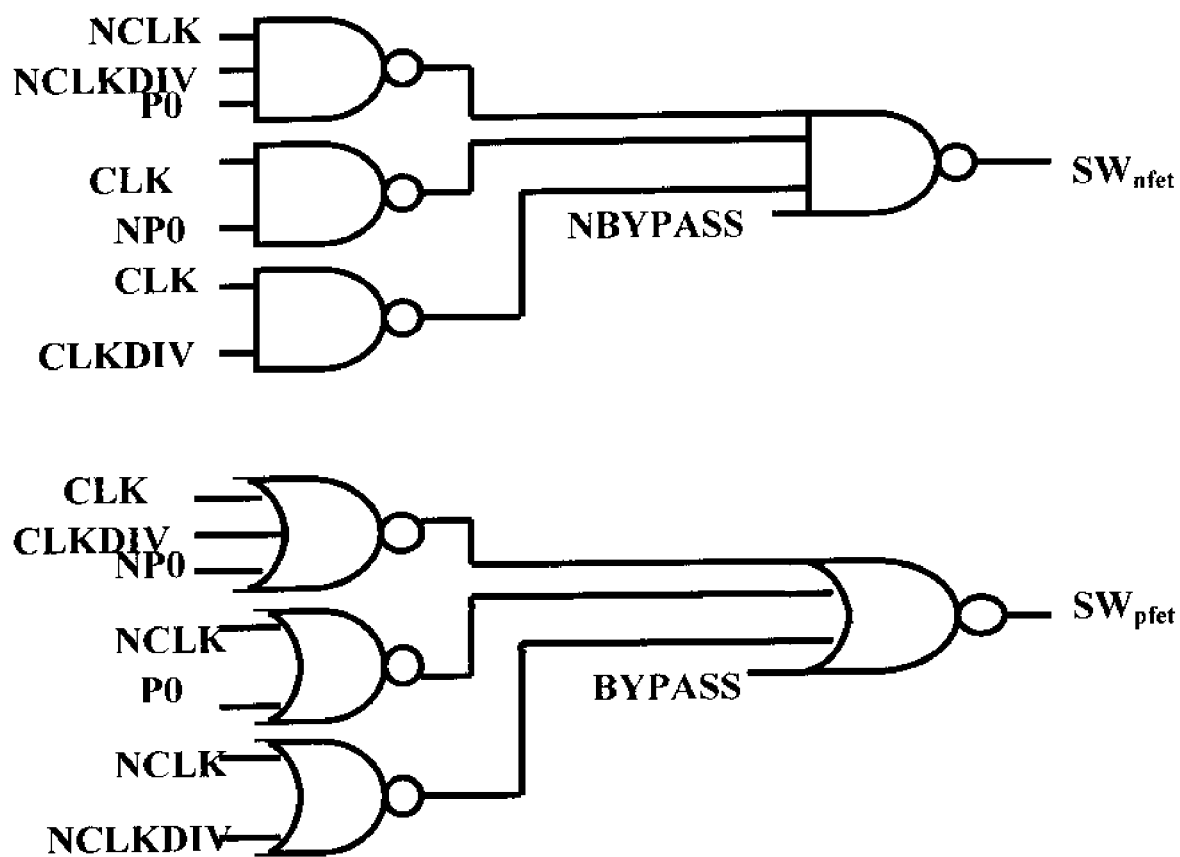
FIG. 21 schematically illustrates a logical representation of the invention shown in FIG. 9 with bypass.

Further, the instant edge alignment or synchronization device can be operated in a bypass mode, whereby no alignment or synchronization of the clock signals occurs. A logical schematic of the invention with bypass is shown in FIG. 21. From the illustration, when BYPASS=1 (NBYPASS=0), $SW_{Nfet}$=1 and $SW_{Pfet}$=0 (switch closed) and the signal passes through the shaping latch. When BYPASS=0, the shaping latch is controlled according to Table 1 (see FIG. 9).

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

While the invention has been described in terms of exemplary embodiments, those skilled in the art will recognize that the invention can be practiced with modifications and in the spirit and scope of the appended claims.

What is claimed is:

1. An integrated circuit capable of aligning a first signal with a second signal that is a divide ratio of the first signal, the integrated circuit comprising:
    a single latch;
    a switch control circuit coupled to an input of the single latch to align an edge of the first signal with an edge of the second signal and to produce, for both an odd and an even divide ratio, a 50% duty cycle output.

2. The integrated circuit in accordance with claim 1, wherein the first and second signals have a same frequency.

3. A process for aligning a first signal with a second signal that is a divide ratio of the first signal, comprising:
    applying the second signal to an input of a single switch shaping latch; and
    aligning an edge of the second signal with an edge of the first signal,
    wherein, for both an odd and an even divide ratio, an output of the single switch shaping latch has a 50% duty cycle output.

4. The process in accordance with claim 3, wherein the first and second signals have a same frequency.

5. A clock signal synchronization device comprising:
    a shaping latch composed of a single switch structured and arranged to align a clock signal and a divided clock signal, which is a divide ratio of the clock signal, and to output a 50% duty cycle.

6. The clock signal synchronization device in accordance with claim 5, further comprising a divider, arranged to output the divided clock signal, coupled to the shaping latch.

7. The clock signal synchronization device in accordance with claim 6, wherein the divider is an adjustable divider.

8. The clock signal synchronization device in accordance with claim 6, wherein the divided ratio of the clock signal is an even divided ratio.

9. The clock signal synchronization device in accordance with claim 6, wherein the divided ratio of the clock signal is an odd divided ratio.

10. The clock signal synchronization device in accordance with claim 5, wherein the switch comprises a CMOS switch.

11. The clock signal synchronization device in accordance with claim 6, wherein the divider creates a delay in the divided ratio of the clock signal with respect to the clock signal of between 0 and ½ a clock cycle.

12. The clock signal synchronization device in accordance with claim 11, wherein the clock signal is inverted before being input to the divider.

13. The clock signal synchronization device in accordance with claim 6, wherein the divider creates a delay in the divided ratio of the clock signal with respect to the clock signal of between a clock cycle and a full clock cycle.

14. The clock signal synchronization device in accordance with claim 13, wherein the clock signal is input directly into the divider.

15. The clock signal synchronization device in accordance with claim 5, wherein the clock signal and the divided clock signal have a same frequency, and the shaping latch aligns the edges of the clock signal and the divided clock signal having the same frequency.

16. The clock signal synchronization device in accordance with claim 15, wherein the shaping latch creates a delay between clock signal and the divided clock signal.

17. The clock signal synchronization device in accordance with claim 5, wherein the clock signal and the divided clock signal have a different frequency, and the shaping latch aligns the edges of the clock signal and the divided clock signal having different frequencies.

18. The clock signal synchronization device in accordance with claim 17, wherein the different frequencies are multiples of each other.

19. A process for synchronizing a first clock signal with a second clock signal composed of a divide ratio of the first clock signal, in which edges of the second clock signal are not aligned with edges of the first clock signal, the process comprising:
    aligning the edges of the second clock signal with the edges of the first clock signal through a shaping latch composed of a single switch,
    wherein, for both an odd and an even divide ratio, a 50% duty cycle is output from the shaping latch.

20. The process in accordance with claim 19, further comprising dividing the first clock signal in a divider to form the second clock signal.

21. The process in accordance with claim 20, wherein the second clock signal is an even divided ratio of the first clock signal.

22. The process in accordance with claim 20, wherein the second clock signal is an odd divided ratio of the first clock signal.

23. The process in accordance with claim 19, wherein the second clock signal has a different frequency than the first clock signal.

24. The process in accordance with claim 23, wherein the second clock signal is a multiple of the first clock signal.

25. The process in accordance with claim 19, wherein the first and second clock signals have a same frequency.

26. The process in accordance with claim 19, wherein the shaping latch creates a delay between a first clock signal and the second clock signal.

27. The process in accordance with claim 19, further comprising delaying the first clock signal.

* * * * *